US008225128B2

(12) United States Patent
Blixt et al.

(10) Patent No.: US 8,225,128 B2
(45) Date of Patent: Jul. 17, 2012

(54) ELECTRONIC TIMER SYSTEM, TIME CONTROL AND GENERATION OF TIMING SIGNALS

(75) Inventors: Stefan Blixt, Balsta (SE); Christian Blixt, Balsta (SE)

(73) Assignees: Conemtech AB, Kista (SE); Imsys AB, Upplands Vasby (SE)

( * ) Notice: Subject to any disclaimer, the term of this patent is extended or adjusted under 35 U.S.C. 154(b) by 365 days.

(21) Appl. No.: 12/529,394

(22) PCT Filed: Feb. 27, 2008

(86) PCT No.: PCT/SE2008/000163
§ 371 (c)(1),
(2), (4) Date: Sep. 1, 2009

(87) PCT Pub. No.: WO2008/105713
PCT Pub. Date: Sep. 4, 2008

(65) Prior Publication Data
US 2010/0100759 A1    Apr. 22, 2010

Related U.S. Application Data

(60) Provisional application No. 60/904,194, filed on Mar. 1, 2007.

(51) Int. Cl.
*G06F 1/12* (2006.01)
(52) U.S. Cl. .................................... 713/502; 713/400
(58) Field of Classification Search .................... 713/502
See application file for complete search history.

(56) References Cited

U.S. PATENT DOCUMENTS

| | | | | |
|---|---|---|---|---|
| 5,982,828 A * | 11/1999 | Fujimori et al. | ............... | 375/356 |
| 6,157,957 A * | 12/2000 | Berthaud | ..................... | 709/248 |
| 6,895,009 B1 * | 5/2005 | Stallkamp | ..................... | 370/394 |
| 7,024,579 B2 * | 4/2006 | Battaia | .......................... | 713/500 |
| 7,058,838 B2 * | 6/2006 | Xu | ................................ | 713/400 |
| 7,596,711 B2 * | 9/2009 | Asplund et al. | ............... | 713/500 |

(Continued)

FOREIGN PATENT DOCUMENTS

GB    2 392 353    2/2004

OTHER PUBLICATIONS

Subrahmanyan, R., "Timing Recovery for IEEE 1588 Applications in Telecommunications", Jun. 2009, IEEE Transactions on Instrumentation and Measurement, vol. 58, No. 6.

(Continued)

*Primary Examiner* — Ryan Stiglic
(74) *Attorney, Agent, or Firm* — Young & Thompson

(57) ABSTRACT

An electronic timer system includes a counter-based time generator (10) for continuously generating raw base time, and a translator (20) for translating between raw base time and local precise time using configurable parameter values. The timer system can be used for generating local precise time by capturing a raw base time value from the counter-based time generator (10) in response to an external event such as a trigger pulse, and using the translator (20) to calculate local precise time from the raw base time value and the parameter values. The timer system can also be used for generating a precisely timed output signal using the translator (20) for translation from precise time of a desired timing event to raw base time. This novel design enables simple and cost-effective practical implementations, and may also support power effective operation of the timer system.

21 Claims, 11 Drawing Sheets

U.S. PATENT DOCUMENTS

| | | | |
|---|---|---|---|
| 7,610,175 B2 * | 10/2009 | Eidson | 702/187 |
| 7,613,212 B1 * | 11/2009 | Raz et al. | 370/510 |
| 7,689,854 B2 * | 3/2010 | Ilnicki et al. | 713/400 |
| 7,870,411 B2 * | 1/2011 | Fraser et al. | 713/375 |
| 7,941,684 B2 * | 5/2011 | Serebrin et al. | 713/400 |
| 8,020,020 B2 * | 9/2011 | Serebrin | 713/375 |
| 8,055,929 B2 * | 11/2011 | Froehlich et al. | 713/400 |
| 2002/0176194 A1 | 11/2002 | Ruegg et al. | |
| 2004/0117682 A1 * | 6/2004 | Xu | 713/400 |
| 2004/0187044 A1 * | 9/2004 | Barman et al. | 713/400 |
| 2005/0039064 A1 * | 2/2005 | Balakrishnan et al. | 713/400 |
| 2005/0180466 A1 * | 8/2005 | Franchuk et al. | 370/503 |
| 2006/0056560 A1 | 3/2006 | Aweya et al. | |
| 2006/0153182 A1 * | 7/2006 | Lockridge et al. | 370/389 |
| 2006/0200254 A1 * | 9/2006 | Krause | 700/20 |
| 2006/0287769 A1 * | 12/2006 | Yanagita et al. | 700/245 |
| 2008/0126820 A1 * | 5/2008 | Fraser et al. | 713/375 |
| 2009/0074407 A1 | 3/2009 | Hornbuckle et al. | |
| 2009/0132884 A1 * | 5/2009 | Suda et al. | 714/744 |
| 2009/0222683 A1 * | 9/2009 | Serebrin et al. | 713/375 |
| 2009/0222684 A1 * | 9/2009 | Serebrin | 713/400 |
| 2010/0250230 A1 * | 9/2010 | Ganguly et al. | 703/26 |

OTHER PUBLICATIONS

Tournier, J., "Strategies to Secure the IEEE 1588 Protocol in Digital Substation Automation", In: Critical Infrastructures, 2009, Fourth International Conference on 20090327 IEEE, Piscataway, NJ, USA.

Meier, S. et al, "IEEE 1588 Syntonization and Synchronization Functions Completely Realized in Hardware", ISPCS 2008, International IEEE Symposium on Precision Clock Synchronization for Measurement, Control and Communication, Ann Arbor, Michigan, Sep. 22-26, 2008.

International Search Report in Corresponding Application PCT/SE2009/050729 dated Oct. 6, 2009.

International Search Report dated Jan. 22, 2009, from corresponding PCT application.

* cited by examiner

ELECTRONIC TIMER SYSTEM, TIME CONTROL AND GENERATION OF TIMING SIGNALS

TECHNICAL FIELD

The present invention generally relates to electronic timer systems and systems requiring precise time or frequency and in particular to synchronization over data communications and/or generation of precisely timed signals.

BACKGROUND

In general, precise timing systems are used in a wide variety of technical applications, e.g. for the purpose of synchronizing movements of industrial machinery, controlling electric power generation and distribution, synchronizing data flows in telecommunication networks, and generating exact frequencies in radio base stations.

Traditional time distribution uses a clock function that emits a time signal, e.g. a pattern of pulses at regular intervals. This may be accompanied by messages stating the time of day, or equivalent information related to the time signal. Automatic receiving stations can use the time signal and associated data for synchronization of their local clocks.

Communications now increasingly use packet switching, both locally and globally. Data to be transferred is then divided into packets, which are transferred through a network where they are sharing communication links with other traffic and may be delayed by varying amounts of time. The delay variations limit the synchronization accuracy unless special methods are used to compensate for them.

The stations may be computers or embedded digital control systems, in which case software in the station can be used for the control of the synchronization process. This software could contain functions for receiving and interpreting the time information and adjusting for any errors or inaccuracies in the data transfer. The software would be responsible for using the received time information for adjusting the setting and the speed of the local clock so that it, as well as possible, is synchronized with the clock that produced the time signal. There would also be software functions that enable the use of the local clock. If there is a local operating system and application programs, these should have the access they need to the local clock time value. There might also be hardware interfaces directly controlled by the local clock, in order to make things happen at more precise time than would be possible with software control. As an example there might be logic circuitry that regenerates a precise time signal, to be used by some local hardware device.

The generation of timing signals and distribution of time via networks is generally applicable in many different technical applications. For example, distribution of time is useful for computers connected to Internet. For some other kinds of network nodes higher accuracy may be needed. One example is in the field of industrial automation, where digitally controlled factory machines may need to work together. Another important area is telecommunication infrastructure, e.g. base stations for mobile telephony, where the different units must be well synchronized, and the radio frequencies they synthesize have to maintain a high accuracy.

For example, consider a "master" unit, equipped with a stable clock, which is perhaps kept accurate by a 1 pps (pulse per second) time signal from a GPS (Global Positioning System) receiver. The master distributes its time information over a packet network, e.g. one using the TCP/IP (internet) protocol, to slave units. See FIG. 1.

The Network Time Protocol (NTP) is a standard protocol for such time distribution, and IEEE 1588 is a new standard protocol for more precise time distribution, with the aim of reaching an accuracy of a fraction of a microsecond.

Typical for packet networks is that packets are delayed on the way from sender to receiver. The IEEE 1588 protocol can adjust for this, because it includes a method for measuring the delay time, based on the assumption that it is the same in both directions. There are normally some fluctuations in the delay time, and the control algorithm should compensate for that by implementing a suitable filter characteristic in its control loop, averaging the normal fluctuations and disregarding erroneous data and any occasional abnormal delays that may occur due to e.g. collisions, in a network with intermediate buffering of packets.

The basic synchronization protocol according to IEEE 1588 is schematically illustrated in FIG. 2. The master sends "sync messages" to the slave, each one followed by a "follow-up message", which includes a "timestamp" that tells the slave what time the master's clock showed when the sync message left the master. The slave timestamps its reception of the sync message, and calculates the difference between the timestamps for reception and transmission. That difference should on average be constant if the slave clock has the same speed as the master clock. If the difference tends to increase or decrease, then the slave should adjust the speed of its clock to counteract the trend, so that the average difference stays constant.

This average difference should be equal to the average delay time. The slave regularly measures the delay time by sending a "delay request" message to the master. The slave timestamps the sending of this message and the master timestamps the reception and the master then sends, in a "delay response" message, its timestamp to the slave. Using these timestamps and those from the sync message transmission and reception, the slave then calculates the sum of the forward and backward delay measurements. Any error in the slave's own clock time gets cancelled out in this calculation, since it would have opposite sign in the two differences that are added together. The sum is then divided by 2 to get a result that would be the actual delay time if the delays, including random fluctuations, were equal in both directions. From this value, which is the desired difference between slave timestamp and master timestamp of each sync message, the previously measured difference for the sync messages should be subtracted in order to obtain the correction that should be added to the slave clock (a positive correction should move its time forward). Usually the corrections are filtered before being applied, in order to even out the random jitter. Also, non-typical values, caused by less common collision events on the network, may be omitted or given lower weight in an averaging filter. If the resulting correction value is negative the slave decrements or retards its clock, and if the correction value is positive it advances its clock, until the average difference for the sync messages becomes equal to the measured difference for the delay request messages (and thereby also to the calculated actual delay time. Two feedback loops are used: One uses only data from the more frequent sync messages and controls the speed of the local clock, essentially trying to keep the measured master-to-slave delay constant. The other, which has a much slower regulation, uses also the less frequent delay request measurements, and controls the phase of the clock, so that it not only has the same speed as the master clock but also shows the same time. Note that changing the speed will in time change the time value compared to the master, and that it may therefore be sufficient to regulate only the speed. A change of the phase is then accomplished by intentionally running the frequency a little too high or too low until the desired phase change has been obtained. This way the local precise time will have the sometimes important property of being monotonous, with a rate of change that can vary only within given limits.

If no special hardware is used, the normally unpredictable delays in the software in master and slave are part of the uncertainty in the over-all path delay. The IEEE 1588 standard describes, however, a way to eliminate that part of the uncertainty, by doing the time stamping at the physical interface. See FIG. 3, which illustrates a layered representation of the master and slave. PHY represents the physical layer and is the electrical interface, typically where analog signals are generated and decoded, respectively, when transmitting and receiving. MAC is the Media Access Control layer, typically a digital hardware subsystem, and the layers above are software. IP (Internet Protocol) and UDP (User Datagram Protocol) are parts of the standard packet communication protocol used e.g. on the Internet, and PTP is the special Precise Time Protocol specified by IEEE 1588. The delay time through the software typically depends on many things, also on unrelated activities that share the processor's time, and will vary unpredictably. Special time stamping hardware registers the time when the SFD (Start of Frame Delimiter) byte passes from MAC to PHY (on transmission) and from PHY to MAC (on reception), and passes the registered timestamps of the IEEE 1588 frames up to the PTP protocol software.

In these systems, a clock generally consists of a sufficiently stable oscillator and some kind of hardware counter that is advanced by the oscillator. The oscillator frequency needs to be high in order to obtain the fine precision typical of IEEE 1588-based systems: a precision of 10 ns requires a frequency of 100 MHz. The counter can be a simple counter, i.e. one which, for every cycle, changes by 1 in its least significant bit position, arranged to directly show the time in the desired format, e.g. in units of 8 or 16 nanoseconds if a binary nanosecond value is needed.

This could be done by having a controllable oscillator, which could be controlled, by the protocol feedback loop, to have exactly the desired frequency, e.g. 1,000 MHz/8=125 MHz. For this high frequency, the oscillator would probably be replaced by a lower-frequency oscillator followed by a phase-locked loop (PLL). The requirement for variable frequency may increase the cost for low-cost slave systems, and may be difficult to combine with high stability requirements for master clocks.

An alternative, which is used by some equipment makers, is to use a clock signal source consisting of a fixed frequency oscillator, or a combination of a fixed frequency oscillator and a PLL, and let the counter consist of an accumulator register, an adder, and an increment register, and add the increment to the accumulator register in every cycle of the clock signal. This solution is sometimes referred to as an adder-based time generator. The increment value can then be adjusted instead of the oscillator frequency. Very small adjustments must be possible. If an adjustment step down to one billionth (1 nanosecond per second) is required, then the increment must have at least 30 fraction bits, i.e. bit positions to the right of the binary point. A disadvantage is the power consumption of this wide hardware operating at this high frequency.

U.S. Pat. No. 7,024,579 relates to a configurable timing system having a plurality of timing units interconnected via software programmable registers to perform a count operation.

SUMMARY

It is a general object of the invention to provide an improved electronic timer system.

It is also an object of the invention to provide an improved time distribution system.

It is a specific object to provide an improved method for generating local precise time of an electronic timer system.

It is a specific object to provide an improved method for generating a precisely timed output signal of an electronic timer system.

These and other objects are met by the invention as defined by the accompanying patent claims.

A basic idea is to provide an electronic timer system having a counter-based time generator for continuously and directly generating raw base time, and a translator, to be used when needed, for translating between raw base time, denoted $t_r$, and local precise time, denoted $t_p$, of the timer system. The translator is preferably configured for operation based on the following relation:

$$t_p = A \cdot t_r + B,$$

where A and B are configurable parameter values.

This novel design enables simple and cost-effective practical implementations, and also supports power effective operation of the timer system.

In a first exemplary aspect, the timer system can be used for generating local precise time by capturing a raw base time value from the counter-based time generator in response to an external event such as a trigger pulse and, if needed, using the translator to calculate local precise time from the raw base time value and the parameter values A and B. Whether or not the translation need be done may depend on conditions, e.g. on contents of an Ethernet frame that has been time stamped.

In a second exemplary aspect, the timer system can be used for generating a precisely timed output signal by defining precise time of a desired timing event, then using the translator, with the current parameter values A and B, to calculate a coincidence value as a corresponding raw base time value based on the defined precise time, and generating the timed output signal (a transition in the output signal) when (in the cycle in which) the value of the continuously generated raw base time of the counter-based time generator is equal to the calculated coincidence value.

The invention is applicable in many different technical areas and applications such as packet networks, industrial automation, and communication infrastructures, and especially for time distribution applications.

BRIEF DESCRIPTION OF DRAWINGS

The invention, together with further objects and advantages thereof, will be best understood by reference to the following description taken together with the accompanying drawings, in which.

DETAILED DESCRIPTION

An electronic clock (i.e. a timer system) traditionally either has a high-frequency oscillator and a counter, with adjustable frequency and phase (i.e. time), or an adjustable increment, typically with a long fractional part, and an adder that with a fixed (not controlled) frequency adds this increment to an accumulator register. In the invention, the local clock can be adjusted without changing the oscillator frequency. Also, the invention enables the use of a simple counter that steps (up or down) by 1 for each cycle.

An electronic timer system according to a preferred exemplary realization comprises a counter-based time generator for continuously generating raw base time, and a translator for translating between raw base time and local precise time. Preferably, the translator is configured to operate according to the following relation:

$$t_p = A \cdot t_r + B,$$

where local precise time of the timer system is denoted $t_p$, raw base time of the timer system is denoted $t_r$, and A and B are configurable parameter values controlling the local clock. For example, A controls the speed of the local "virtual" clock and B controls the setting of the current time.

Figure 1:
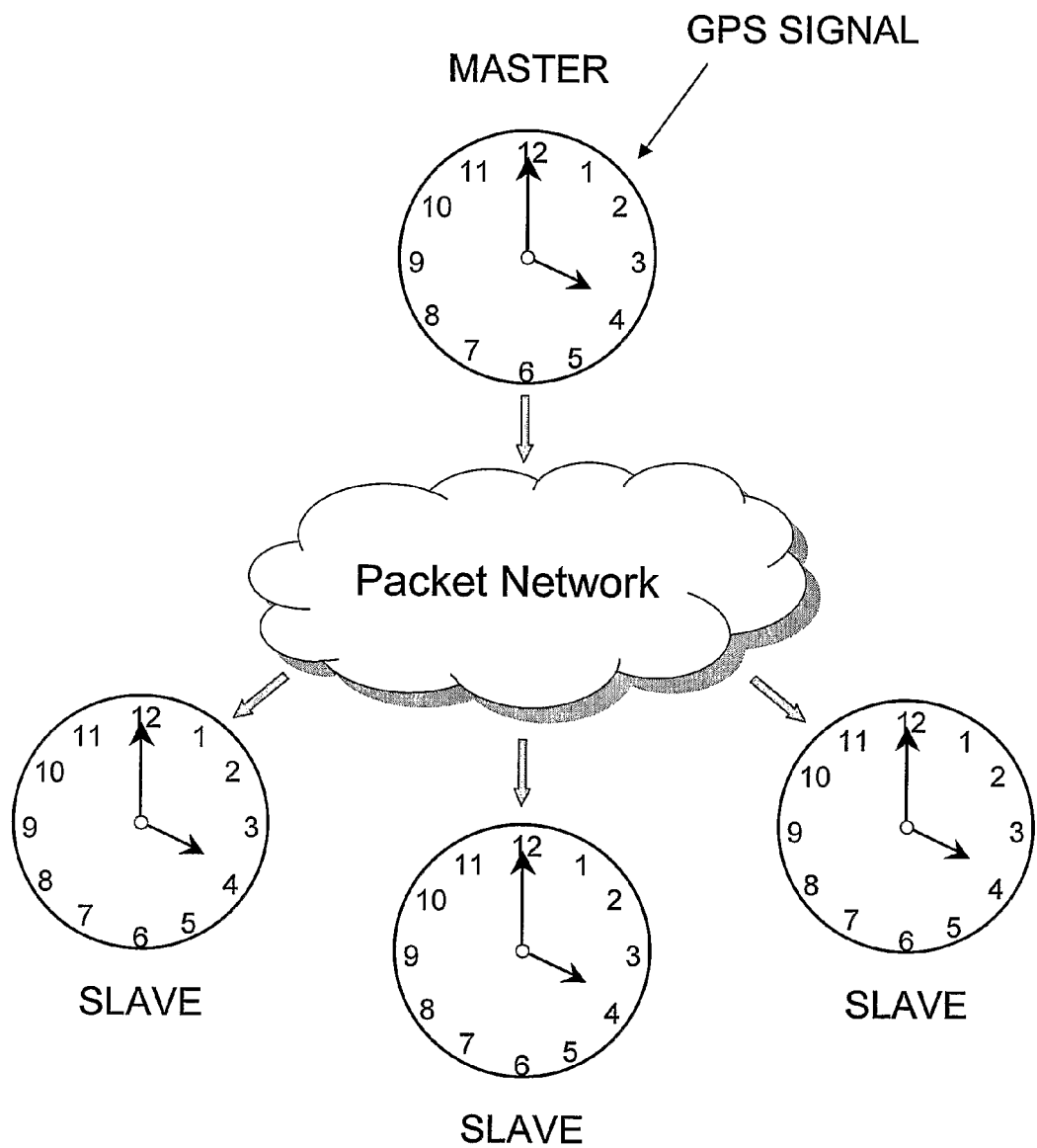
FIG. 1 is a schematic diagram illustrating an example of time distribution in a master-and-slave setting.
Figure 2:
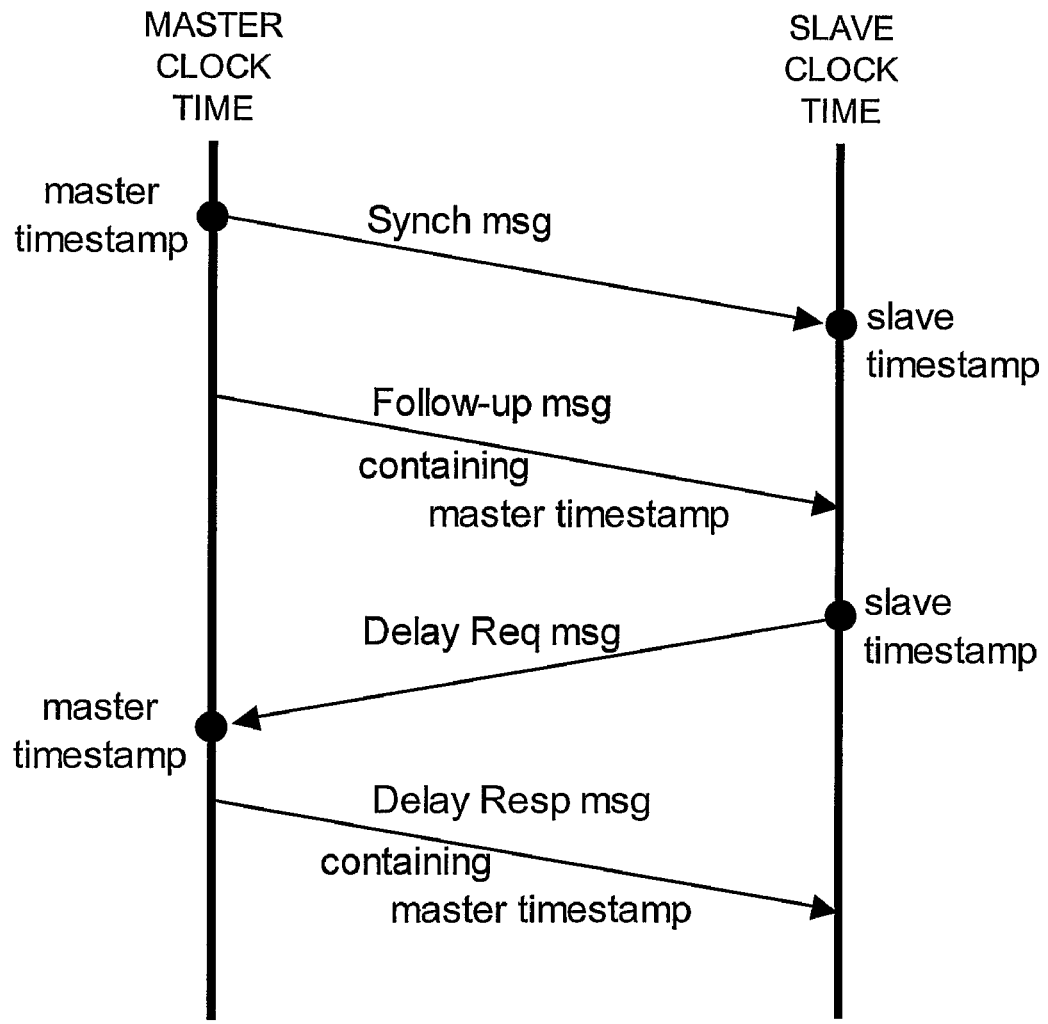
FIG. 2 is a schematic diagram illustrating the basic synchronization protocol of the IEEE 1588 standard.
Figure 3:
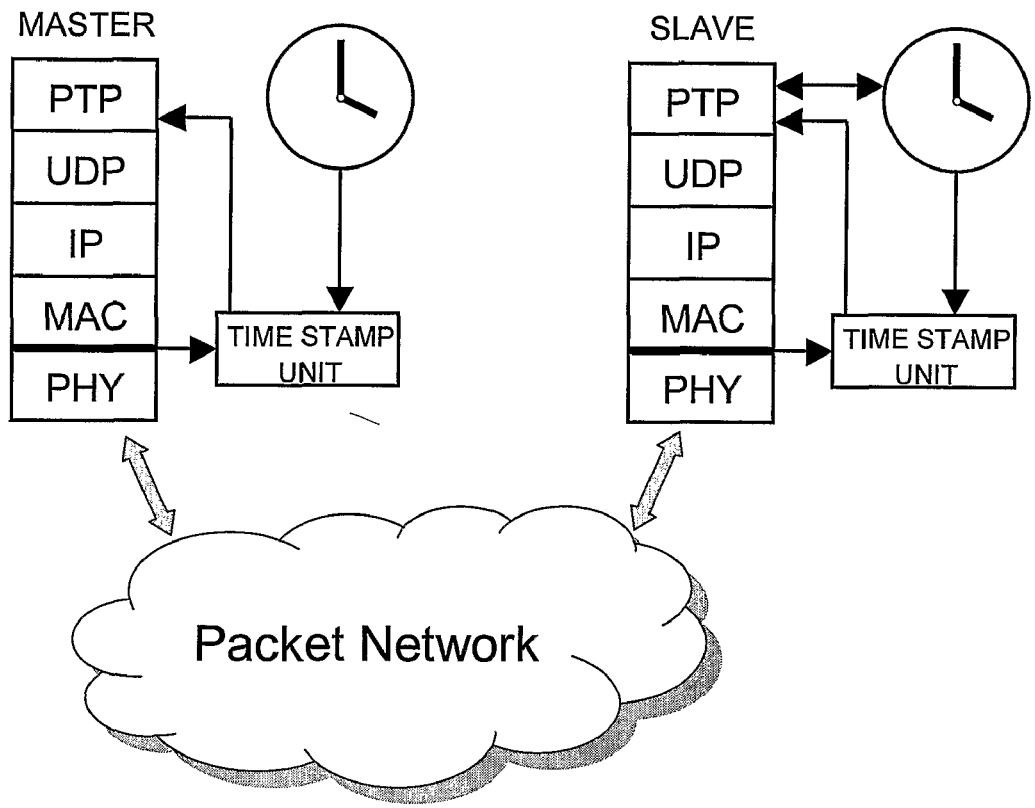
FIG. 3 is a schematic diagram illustrating a layered representation of master and slave in a time distribution system.
Figure 4:
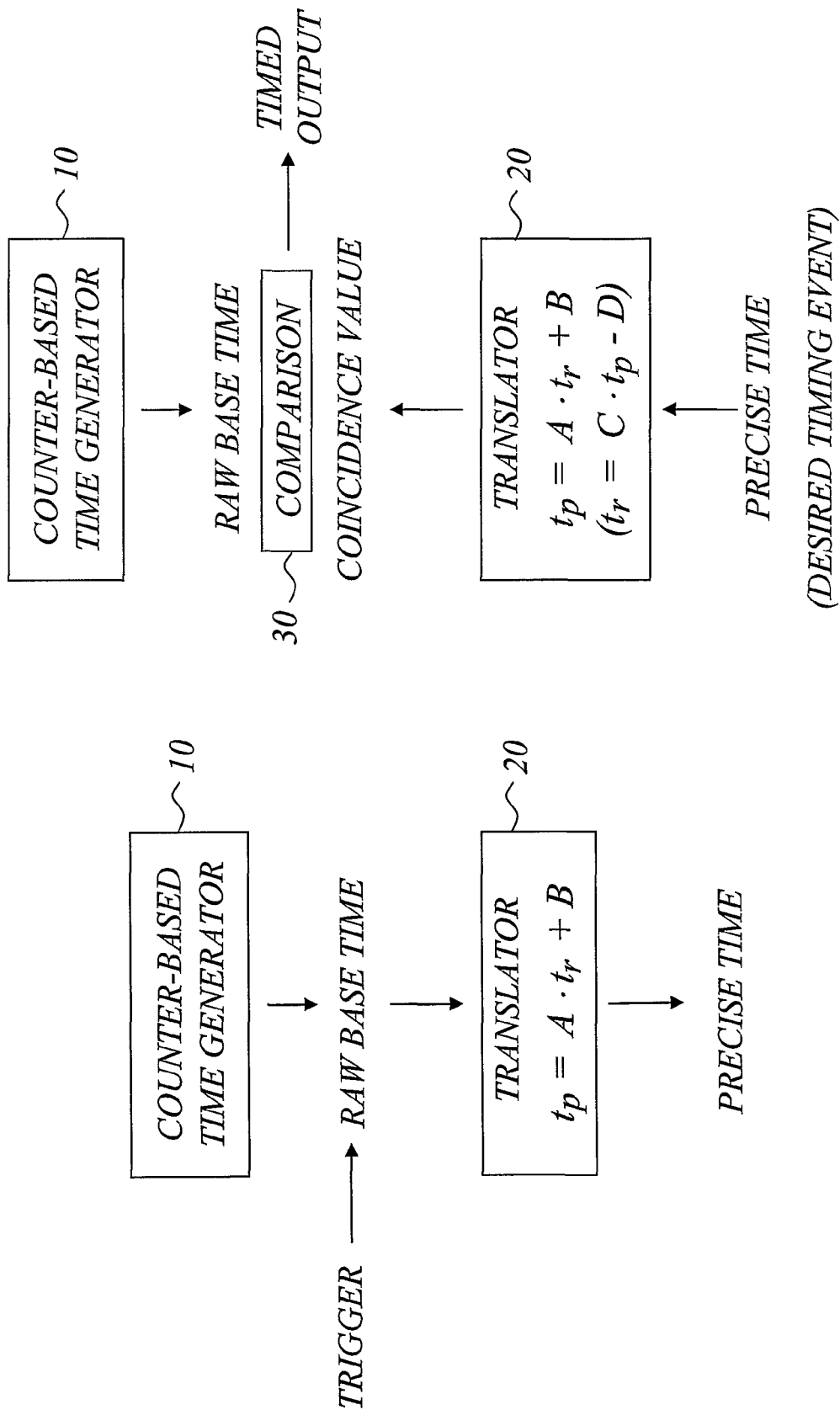
FIG. 4A is a schematic diagram illustrating an electronic timer system according to a preferred exemplary embodiment of the invention used for generating precise time from raw base time.
FIG. 4B is a schematic diagram illustrating an electronic timer system according to a preferred exemplary embodiment of the invention used for generating a timed output signal.

FIG. 4A is a schematic diagram illustrating an electronic timer system according to a preferred exemplary embodiment of the invention used for generating precise time from raw base time. In this situation, the timer system is configured for capturing a raw base time value from the counter-based time generator 10 in response to an external event such as a trigger pulse TRIGGER. The translator 20 of the timer system takes the captured raw base time value as input together with the parameter values A and B to generate local precise time.

FIG. 4B is a schematic diagram illustrating an electronic timer system according to a preferred exemplary embodiment of the invention used for generating a timed output signal. In this situation, the translator 20 takes a defined precise time of a desired timing event as input together with the parameter values A and B to calculate a so-called coincidence value as a corresponding raw base time value. The coincidence value generated by the translator 20 is then continually compared in a comparator 30 to the value of the raw base time of the counter-based time generator 10. A timed output signal is generated when the value of the continuously generated raw time base of the counter-based time generator 10 runs equal to the calculated coincidence value.

From the given relation between raw base time and precise time, the raw base time can be expressed as:

$$t_r = (t_p - B)/A.$$

This may be re-written as:

$$t_r = t_p/A - B/A = C \cdot t_p - D,$$

where C=1/A and D=B/A.

In a preferred exemplary embodiment, the expression $t_r = C \cdot t_p - D$ is used in the practical implementation because multiplications are much faster to execute than divisions. The parameters C and D are calculated based on the parameter values A and B and stored for usage as and when needed. They are normally high precision numbers.

The unique design principle proposed by the invention allows for simple and cost-effective implementations and also allows for power-efficient operation of the timer system.

For example, the translator may be implemented by program code in a suitable processor, preferably using existing arithmetic resources of the processor. Preferably, although not necessarily, the entire timer system may be implemented on a single microcontroller chip. For example, a microcode-programmed processor may be used, and the microcontroller chip then preferably includes a microcode-programmed processor having a processor core and micro program memory for the microcode. In a preferred implementation, the lowest level of programmed control, the level closest to the hardware and most time critical, is executed by dedicated microcode in a microcode-programmed processor (e.g. the MAC logic and time stamping).

It should though be understood that different implementations of the timer system of the invention are possible, using any suitable combination of software and hardware logic.

The present invention uses a new and truly unique principle. It allows the use of an inexpensive oscillator, which does not have to be adjustable, and only requires very little hardware that needs to operate at high frequency.

No dedicated adder has to be used. Instead the ordinary arithmetic resources of the processor can be used for the calculations that are needed.

Figure 5:
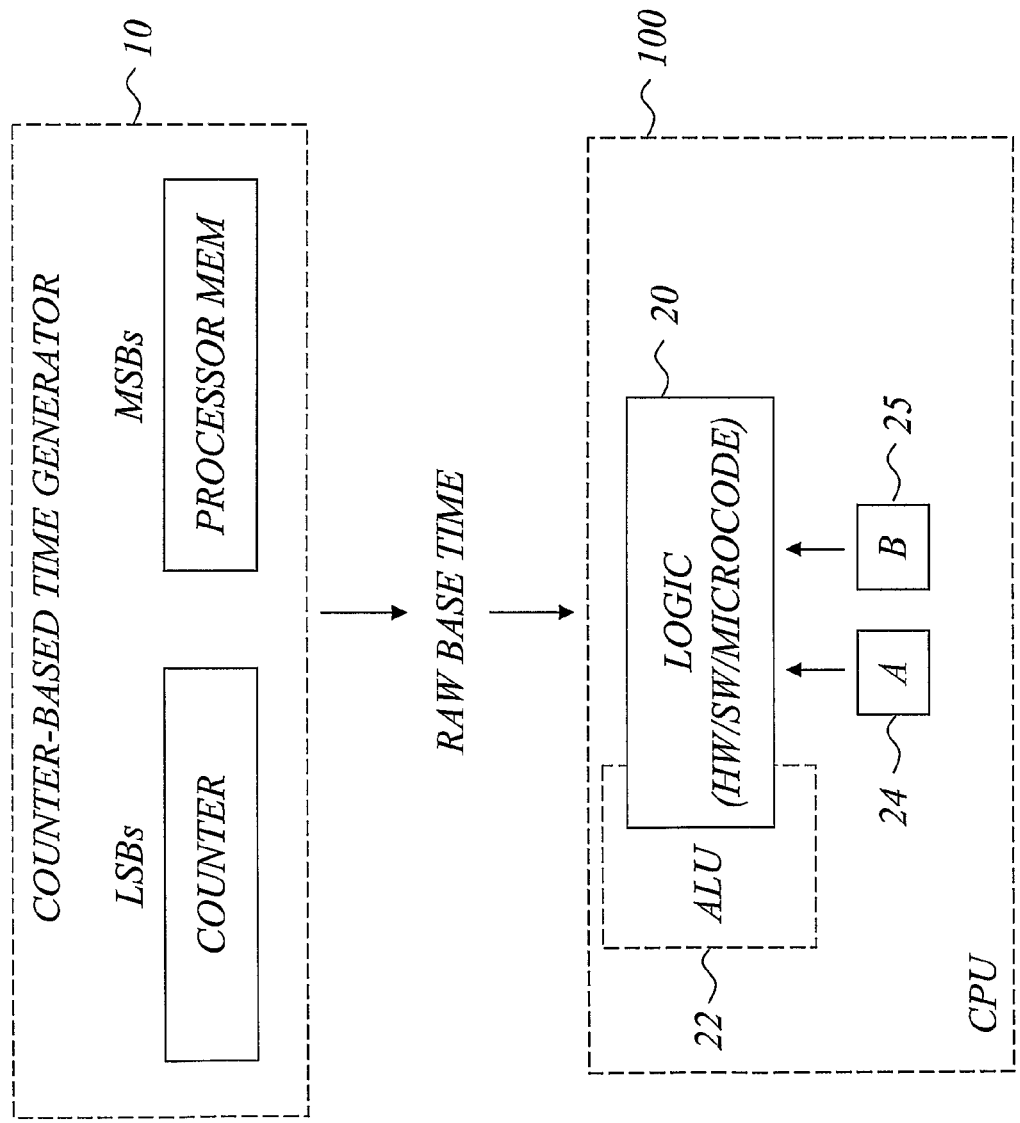
FIG. 5 is a schematic block diagram illustrating a specific exemplary implementation of a timer system according to a preferred embodiment of the invention.

A hardware counter is generally needed, but only the simplest kind of counter is required, which need not be set and which simply increments/decrements by 1 in each oscillator cycle. Of course, more advanced counter-based time generators may be used, but the invention makes it possible to use very simple counters. In a preferred implementation this counter is also relatively short; a continuation for the more significant bit positions may be kept in memory, as schematically illustrated in the example of FIG. 5.

Thus, the counter-based time generator 10 may be based on a hardware counter 12 for the less significant bits (LSBs) of the raw base time in combination with a continuation of the raw base time for the more significant bits (MSBs) in memory, such as the memory 14 of the processor. The hardware counter 12 is normally driven by an oscillator (not shown), and typically the continuation of the raw base time in memory 14 is regularly updated when the counter wraps around (i.e. when the counter sequence starts over again).

The counter, including its more significant continuation in memory, is typically said to contain "raw time". The clock function of the exemplary implementation of FIG. 5 preferably includes of a combination of hardware and software. As mentioned, the logic 20 may advantageously be implemented in microcode, although other software realizations (as well as pure hardware realizations) are possible.

A characteristic of an exemplary embodiment of the invention is that the "software" controls neither the oscillator frequency nor the contents of the counter. Instead the logic 20 (software and/or hardware) is controlled by two parameter values, which define the relation between raw time and precise time, and which are modified when the speed or time value of the local precise time clock needs to be changed.

Such translations are done only when needed, which is relatively infrequent and can be performed by the processor's standard resources. In this way it is possible to reduce the power consumption of the timer system, compared to prior art solutions. Note that the local precise time clock is a virtual clock, in the sense that it is not continuously accessible; its time value has to be calculated when needed. In other words, the translator is triggered on-demand.

As an example, a software program may use the IEEE 1588 principle to measure the frequency and phase errors, filter them and combine them as described above, and thus calculates, at more or less regular intervals, a desired frequency change, which is to be applied to the virtual local precise time clock by changing the parameter values. Note that in this particular example A and B must both be changed, together, for the local precise time to be monotonous. A is adjusted to get the desired "speed" ratio between raw time and local precise time, and B is then changed so that $t_p = A \times t_r + B$ (with $t_p$ and $t_r$ at the time of the change) has the same value after the change as it had before it.

The hardware, which includes the counter 12, can be part of a microcontroller chip, which also executes the software part of the clock function. Also preferred characteristic for this exemplary solution is that the special features required by the hardware timer are of a general kind and usable also for other microcontroller applications.

In a preferred exemplary embodiment, two registers 24, 25 hold parameters, called A and B, and the logic 20 can translate between raw time and local precise time as and when needed. When the translator logic 20 is implemented in microcode or other suitable program code, an efficient implementation option is to use existing arithmetic resources such as the Arithmetic Logic Unit (ALU) 22 of the Central Processing Unit (CPU) for the calculations.

Figure 6:
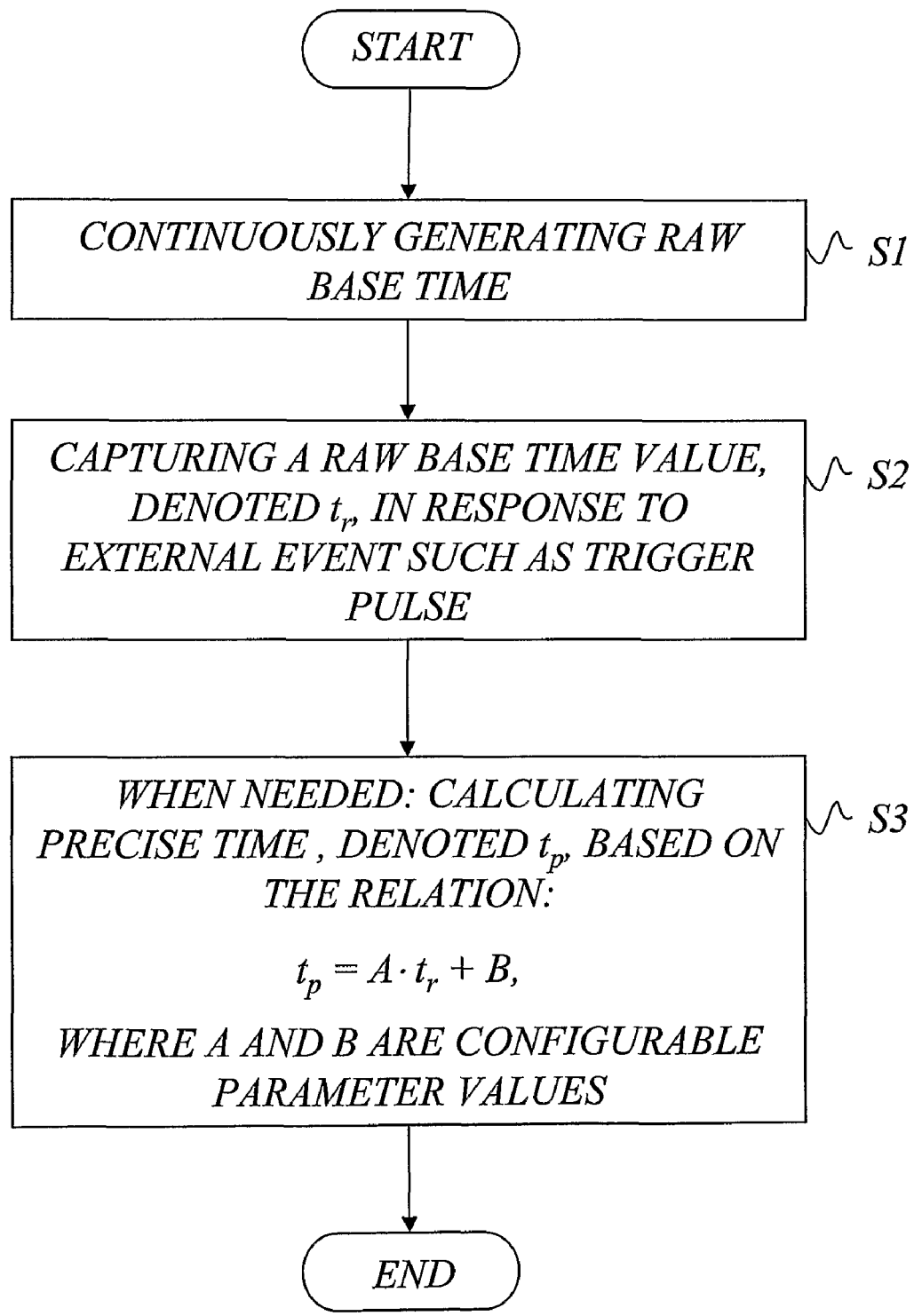
FIG. 6 is a schematic flow diagram of a method for generating precise time according to a preferred exemplary embodiment of the invention.

FIG. 6 is a schematic flow diagram of a method for generating precise time according to a preferred exemplary embodiment of the invention. As indicated in step S1, raw base time is generated on a continuous basis. In response to an external event such as a trigger pulse, a raw base time value is captured, as indicated in step S2. As indicated in step S3, the clock function can then calculate:

$$t_p = A \cdot t_r + B,$$

where $t_r$ is the captured raw time provided by the counter-based time generator. The result $t_p$ is the local time of the clock, the precise time it would report as a response if an application program would issue a call to get the time. Preferably, the calculation is, however, only performed when needed, i.e. for most of the time this local precise time is only "virtual".

Setting the time is preferably done by changing the contents of the parameter register B. Adjustment of the clock speed is done basically by changing the contents of the parameter register A. It is, however, normally necessary to also adjust B when A is changed; otherwise the current (virtual) time value will change.

Figure 7:
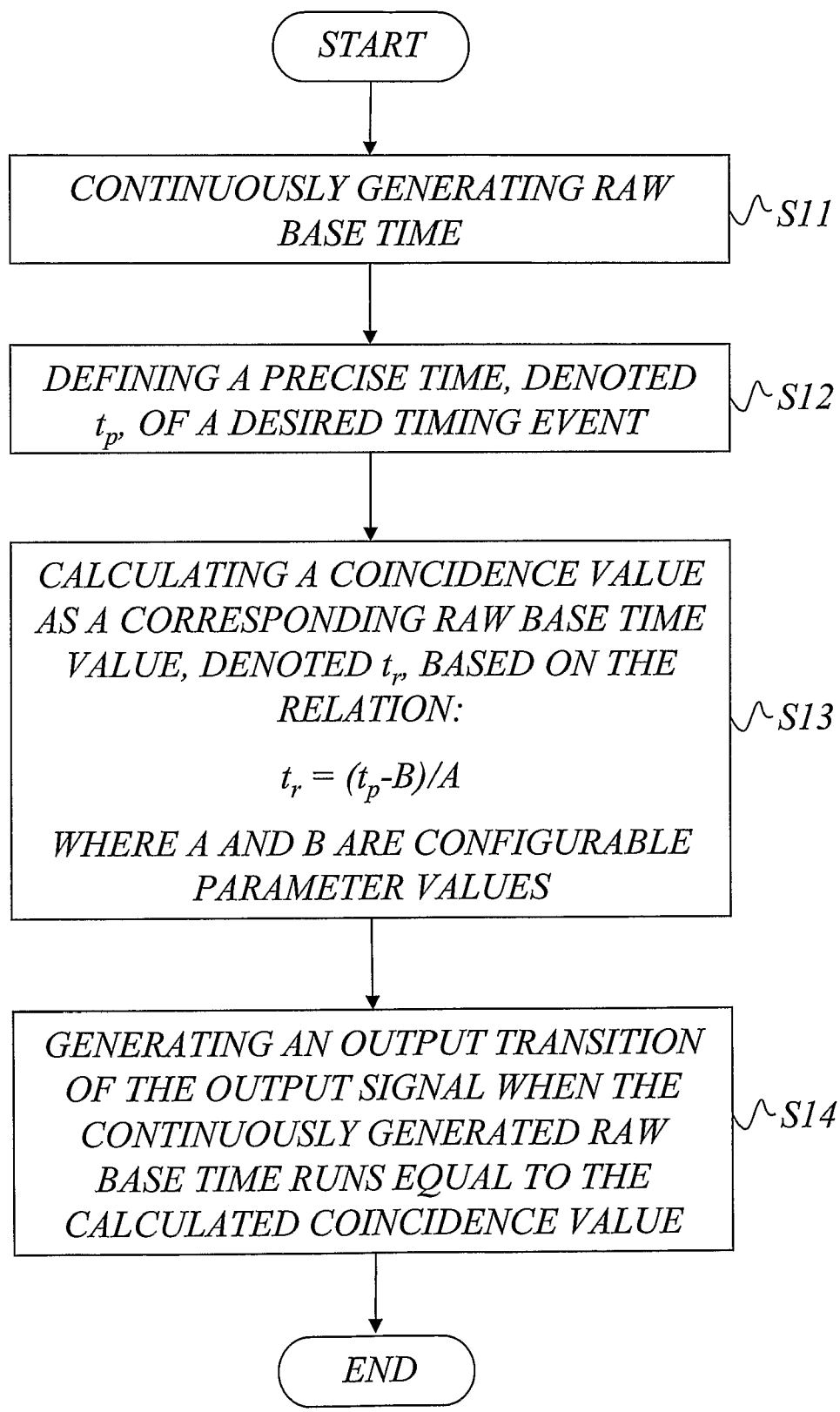
FIG. 7 is a schematic flow diagram of a method for generating a precisely timed output signal according to a preferred exemplary embodiment of the invention.

FIG. 7 is a schematic flow diagram of a method for generating a precisely timed output signal according to a preferred exemplary embodiment of the invention.

A timed output signal is generated in the following way. As indicated in step S11, raw base time is generated on a continuous basis. A precise time $t_p$ for a desired timing event such as the next output signal transition (e.g. the start of a pulse) is determined in step S12. Then this is converted to raw time in step S13 by calculating:

$$t_r = (t_p - B)/A.$$

As previously indicated, for efficient implementation, raw time is preferably calculated as $C \cdot t_p - D$, where $C = 1/A$ and $D = B/A$. The parameters C and D are typically pre-calculated and stored so they can be used several times. This means that multiplications rather than divisions are executed when calculating raw time values. The parameters C and D may be updated when the parameters A and B are changed, or the first time they are needed after A and B have been changed.

Then the $t_r$ value is loaded into a coincidence register. The coincidence register is connected to a comparator that continually compares it with the raw time counter, and when they are equal (i.e. at coincidence) the logic executes the needed output transition as indicated in step S14. An interrupt request may also be generated, indicating that the logic can now calculate and load the next coincidence value.

As mentioned, the invention is generally applicable for time control and/or for generating timed output signals. For example, the proposed timer system may be configured for time distribution applications such as Network Time Protocol (NTP) and IEEE 1588 Precise Time Protocol (PTP) applications.

Figure 8A:
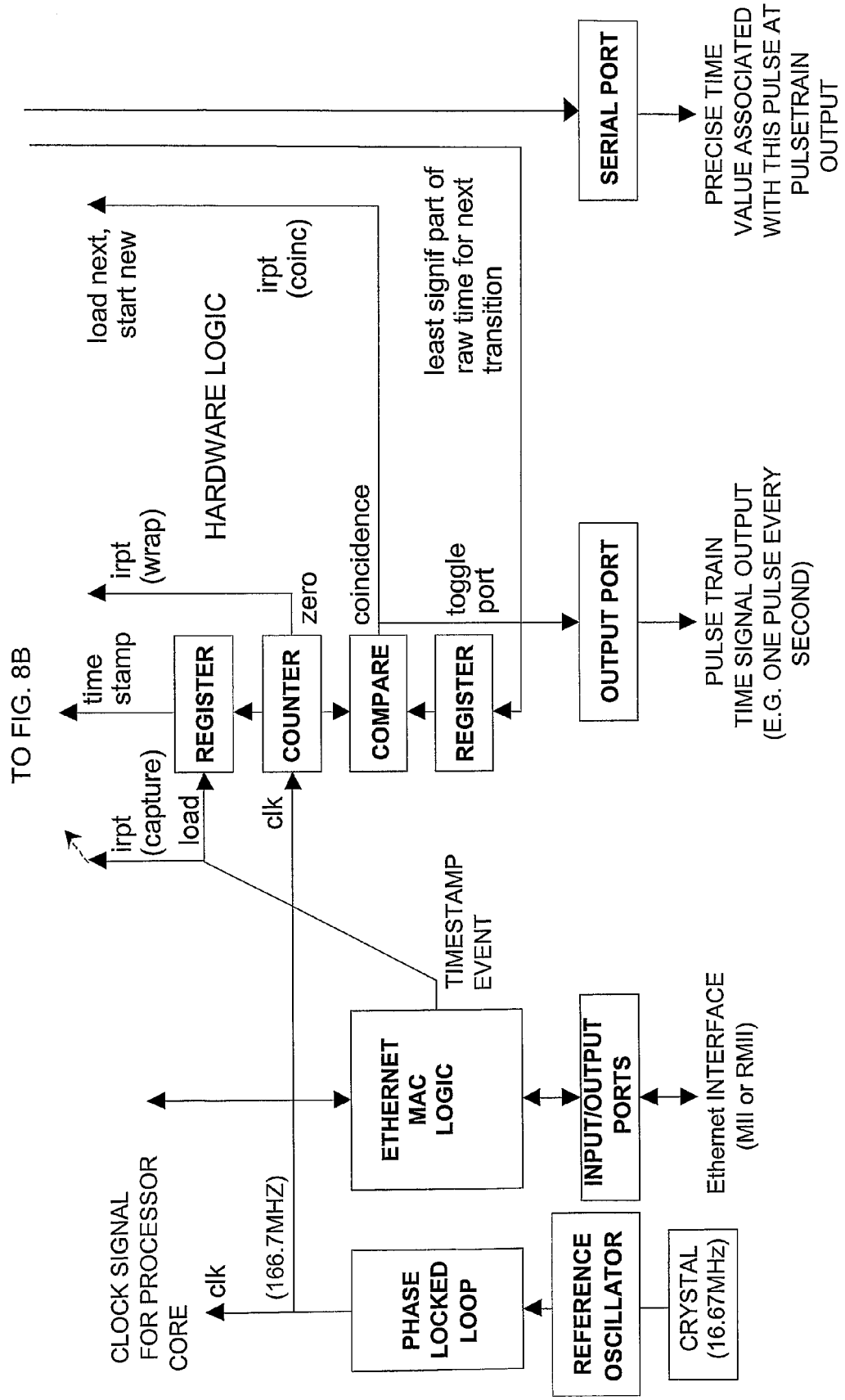
FIGS. 8A-B are schematic diagrams that together illustrate an example of a combined hardware/software system that can be used for time distribution applications.
Figure 8B:
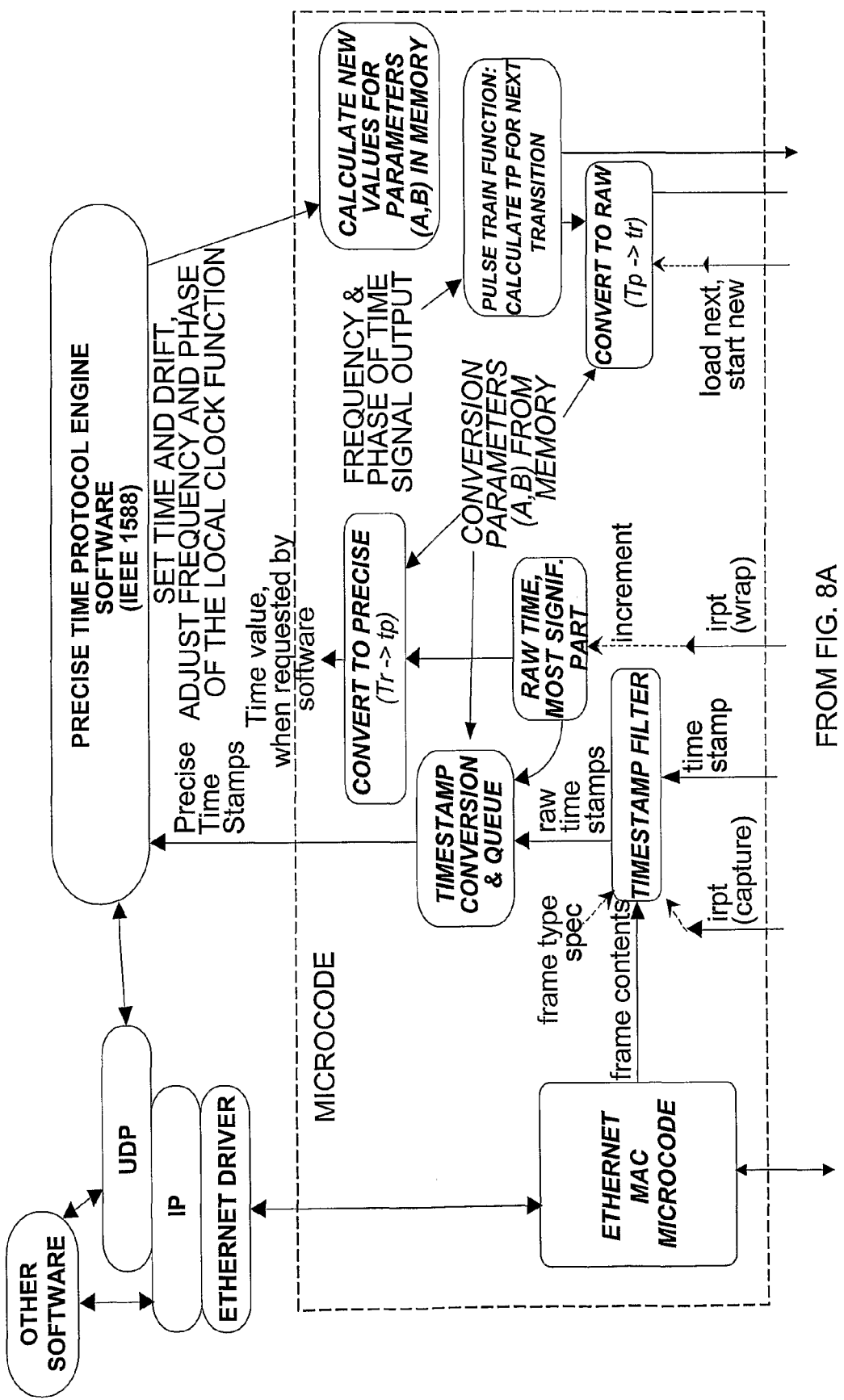

FIGS. 8A-B are schematic diagrams that together illustrate an example of a combined hardware/software system that can be used for time distribution applications. FIG. 8A mainly indicates the hardware logic part of the overall system, and FIG. 8B mainly indicates the software part of the system. The hardware part is based on an oscillator-driven counter and associated registers and a comparator. The counter is for example driven at 166.7 MHz by a reference oscillator via a phase-locked loop. The communication stack is preferably based on Ethernet/UDP/IP, the synchronization is PTP (Precise Time Protocol) engine software, and the microcode (e.g. the time stamp filter) is preferably adapted to IEEE 1588.

Instead of driving the counter at 166.7 MHz and using a 16.67 MHz crystal, other clock frequencies and crystals may be used. For example, the crystal may be a 20 MHz crystal and the clock frequency 200 MHz. It is also possible to use a pre-scaler which down-converts the clock frequency by a factor N (e.g. down-converted 4 times from 200 MHz to 50 MHz).

In the following an implementation according to a particular exemplary embodiment of the invention will be described:

In this particular implementation a microcode-programmed processor is used, which is useful to reach high precision at low power consumption but is not a requirement.

In general, a microcode-programmed processor is a processor in which the general standard operation of the processor is controlled by sequences of microcode words in an internal micro program memory. This should not be confused with the expression "microprocessor", which simply means that the processor is built as an integrated circuit. Naturally, a microcode-programmed processor may also be built as an integrated circuit, but a microprocessor is not by definition equipped with a micro program for controlling its internal operation.

The microcode program, and parts of it, is sometimes simply referred to as microcode. As is normal for microcode-programmed processors (sometimes called CISC processors, for Complex Instruction Set Computer), the instructions defined in the instruction repertoire, or ISA (Instruction Set Architecture) of the processor are executed by microcode in internal ROM (read-only memory) in the processor. In the processor used in this particular implementation, a part of the microcode memory is a writable RAM (random access memory), which is an advantage and an enabler for special functions but not a requirement.

In this preferred implementation, a configurable timer system is used. It may include several timers and is part of a microcontroller chip which also contains the processor core with its micro-program memory.

The lowest level of programmed control, i.e. the level closest to the hardware and most time critical, is preferably executed by dedicated microcode. An example is the Ethernet MAC layer (except for a part of it which is dedicated hardware). The time stamping is also an example.

The next level of programmed control is in machine code, i.e. program code in the main memory (external to the processor), comprising instructions defined in the ISA and developed in assembly language. The top level is also machine code, although it has been developed in high-level language. For example, the logic for the actual translation may be implemented in assembly code.

In a further example, still referring to FIGS. 8A-B, a 10-bit counter repeatedly counts a sequence of 1024 steps and generates a microprogram interrupt request each time it reaches the values 0 or 512. At these interrupts, the microprogram increments the continued (more significant part) counter value in memory. This process creates the "raw time", which is 64 bits long: The format is a 63-bit count of 15-nanosecond clock ticks, with bit 9 (the most significant bit of the 10-bit hardware counter) duplicated into bit 10. The reason for duplicating the most significant bit of the hardware part of counter in the least bit of the software part of the counter is to be able to determine (by the fact that the two bit positions differ) that the software part has been incremented after the hardware timestamp was made (which can happen if the timestamp is taken care of by higher-level software), and to be able to set up a coincidence value close to the counter wrap (see below).

A 10-bit register is arranged to copy the contents of the 10-bit counter when a timestamp pulse arrives. This pulse is generated in the Ethernet MAC logic, at the time an SFD byte is transferred to or from the Ethernet PHY interface. The pulse also generates an interrupt request to the micro-program, which will then read the register and deliver it, together with its more significant continuation, upward to the software as a timestamp, via a queue in memory. This timestamp is in raw time when read from the register, but the microcode converts it to a precise time value as previously described, before delivering it to the software layer. The timestamps are also qualified by the microcode: they are discarded if they turn out not to have been caused by the transmission of a "sync" message or the reception of a "delay response" message.

Those that are not discarded are ordered in a queue together with the associated data about the message.

Generation of a precise time signal from the local clock may be performed in the following way:

The timer system hardware is configured such that the value in the 10-bit counter is continually compared with the contents of a 10-bit coincidence register, and that at coincidence, i.e. when their contents are equal, an output port changes state, and a micro-program interrupt request is generated. The microcode will then calculate what the contents of the 10-bit counter will be at the time of the next transition of the output, and load that value into the coincidence register. Coincidence will also be conditioned on the more significant continuations to be equal, and the microcode is responsible for that part of the comparison.

Figure 9:
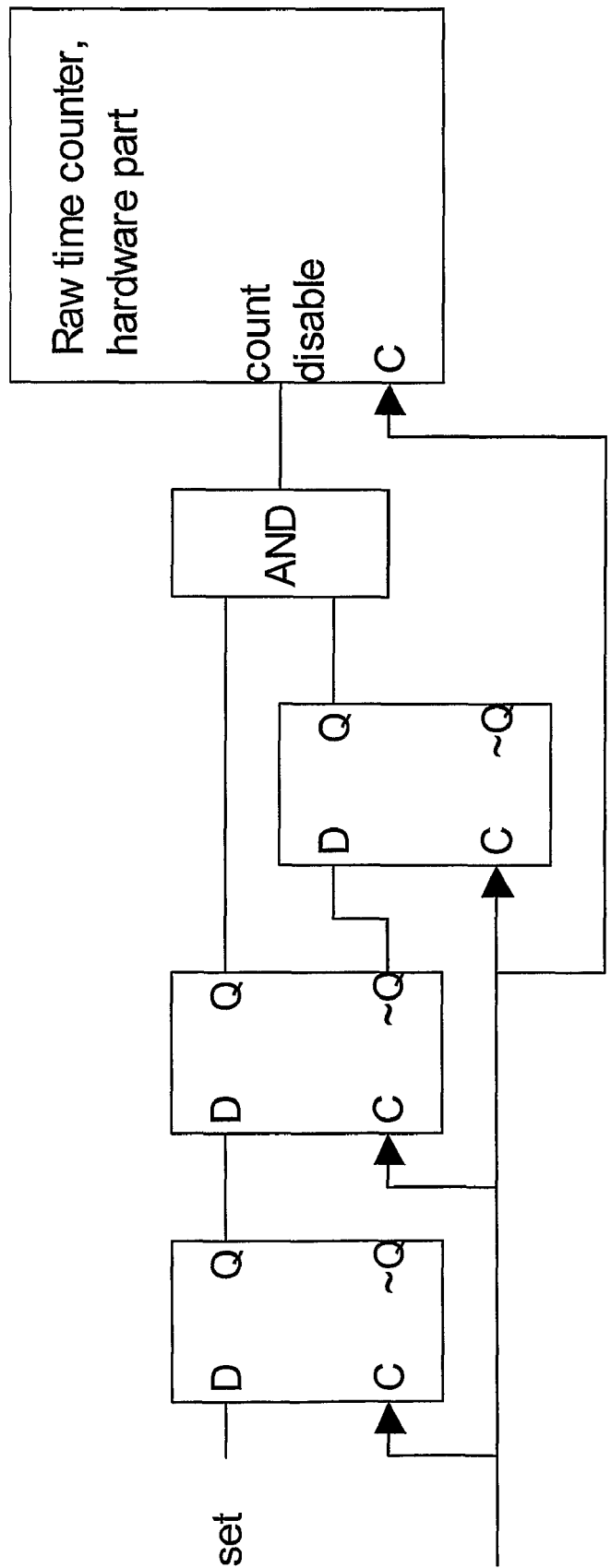
FIG. 9 is a schematic block diagram illustrating an example of how the precision can be increased without increasing the width of the calculation.

In an optional extension, the timer system is configured for inhibiting an increment of the counter of the counter-based time generator at predetermined intervals to increase the precision of the raw base time. This represents a way of increasing the precision without increasing the width (number of bits) of the calculation. Preferably, the speed of the local clock would first be set by adjusting the parameter A, the drift setting, as described. If the parameter, due to its limited number of bits, cannot be set exactly as desired, then it is normally set at the nearest value that makes the virtual local precise time clock go faster than it should. If the resolution of the setting is in billionths, i.e. nanoseconds per second, then one more bit of precision can be achieved by letting one control bit decide whether or not to inhibit one incrementing of the raw time every 2 seconds. A further bit of precision can be achieved by letting a second control bit decide whether or not to inhibit one additional incrementing of the raw time every 4 seconds, and so on. This can be accomplished simply by a flip-flop, which may be set by a software call. When it has been set, it disables the clocking of the counter for exactly one clock cycle, and is then reset again. Reference can be made to FIG. 9. The "set" input must be synchronized to the clock signal C, which is the clock signal that also drives the counter. A software routine, triggered e.g. once every second, determines when a cycle shall be inhibited.

Figure 10:
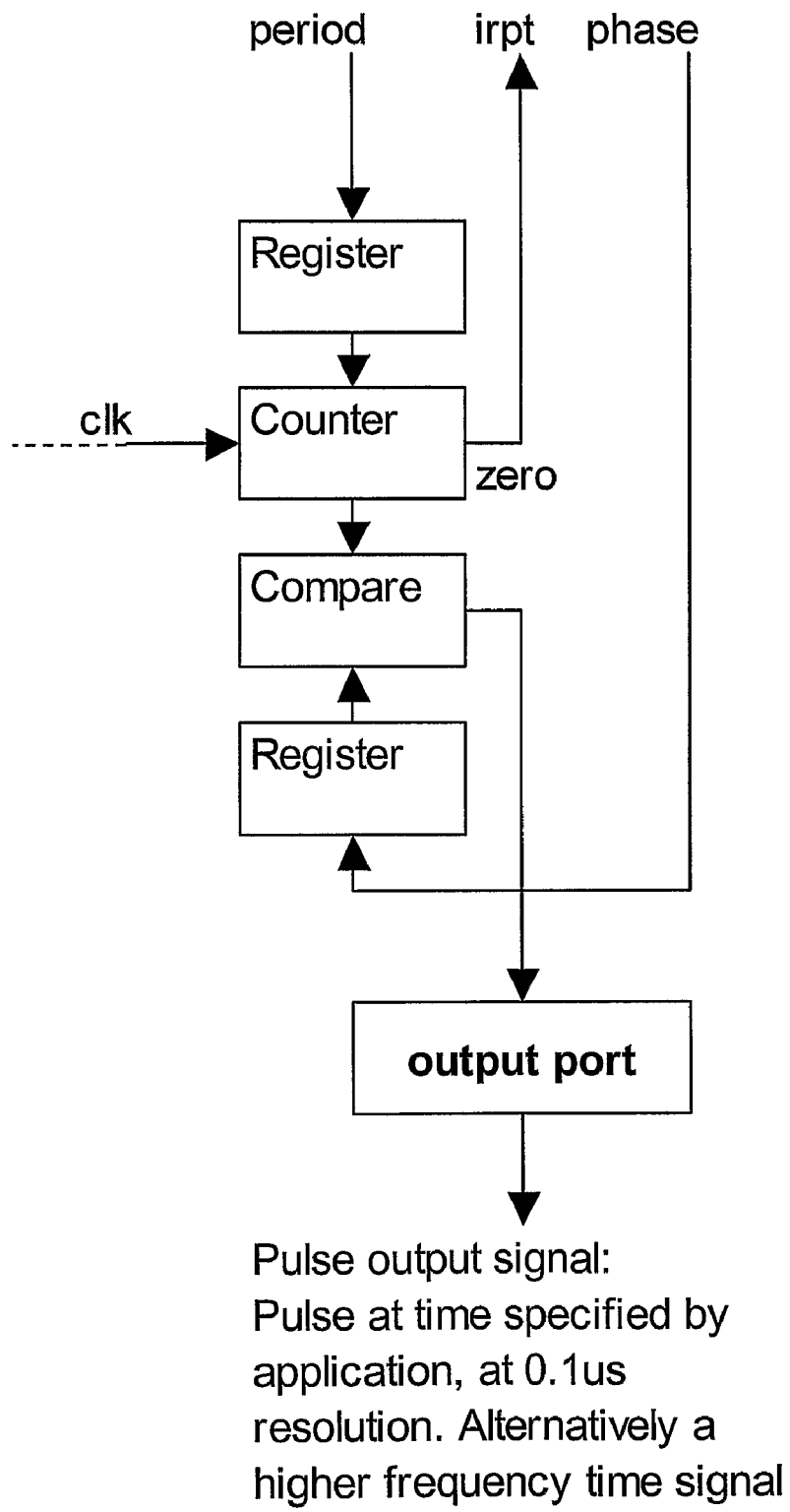
FIG. 10 is a schematic block diagram illustrating an example of how a second output can be generated that can have a higher frequency than the first output.

FIG. 10 describes how a second output can be generated. This added hardware can generate a precise time signal that can have a higher frequency than that of the first output, since it doesn't need an action from the processor for every transition on the output. Alternatively it can generate a pulse at a given time specified by an application program. A second counter is used. This counter is reloaded from a register each time it reaches zero, and thus the frequency of counter laps is determined by the register contents. The phase of the output is separately controlled, by the contents of a second coincidence register connected to the second counter. The counter counts the same clock pulses as the first counter. i.e. it counts raw time units. Thus, the settings of the registers have to be calculated by conversion from precise time as described above.

The embodiments described above are merely given as examples, and it should be understood that the present invention is not limited thereto. Further modifications, changes and improvements which retain the basic underlying principles disclosed and claimed herein are within the scope of the invention.

The invention claimed is:

1. An electronic timer system comprising:
a counter-based time generator for continuously generating raw base time, the raw base time being expressed as a set of raw base time bits;
a translator for translating between raw base time, denoted $t_r$, and local precise time, denoted $t_p$, of the timer system based on the following relation:

$$t_p = A \cdot t_r + B,$$

where A and B are configurable parameter values, which control the speed and setting of the local precise time in relation to the raw base time,
wherein said translator is implemented by program code executed by a processor;
wherein said counter-based time generator for continuously generating raw base time includes a hardware counter for a first portion of the set of raw base time bits of the raw base time in combination with a continuation of the raw base time for a remaining portion of the set of raw base time bits in memory of said processor.

2. The timer system of claim 1, wherein said system comprises means for capturing a raw base time value from said counter-based time generator in response to an external event such as a trigger pulse; and said translator includes means for calculating local precise time based on said raw base time value and the parameter values A and B.

3. The timer system of claim 1, wherein said system comprises means for defining precise time of a desired timing event;
said translator includes means for calculating a coincidence value as a corresponding raw base time value based on the defined precise time and the parameter values A and B; and
said timer system comprises means for generating a timed output signal when a value of the continuously generated raw base time of the counter-based time generator is equal to the calculated coincidence value.

4. The timer system of claim 1, wherein said translator is operated only when needed for translating between raw base time and precise time, thereby reducing the power consumption of the timer system.

5. The timer system of claim 1, wherein said system comprises means for setting the parameter values A and B.

6. The timer system of claim 1, wherein said hardware counter is driven by an oscillator, and the continuation of the raw base time in memory is updated when the counter wraps around.

7. The timer system of claim 1, wherein said timer system comprises means for inhibiting an increment of the counter of said counter-based time generator at predetermined intervals to increase the precision of the raw base time.

8. The timer system of claim 1, wherein a lowest level of programmed control, the level closest to the hardware and most time critical, is executed by dedicated microcode in a microcode-programmed processor.

9. The timer system of claim 8, wherein said timer system is implemented on a microcontroller chip, which includes said micro-code programmed processor having a processor core and micro program memory for said microcode.

10. The timer system of claim 1, wherein said timer system is configured for time distribution applications such as Network Time Protocol (NTP) and IEEE 1588 Precise Time Protocol (PTP) applications, where the local precise time is controlled, via parameters A and B, by logic using timestamps from the counter-based time generator as input.

11. A time distribution system comprising an electronic timer system of claim 1.

12. The time distribution system of claim 11, wherein said time distribution system is based on IEEE 1588.

13. The time distribution system of claim 11, wherein a lowest level of programmed control, the level closest to the hardware and most time critical, is executed by dedicated microcode in a microcode-programmed processor.

14. A method for generating local precise time of an electronic timer system, said method comprising the steps of:
continuously generating raw base time, the raw base time being expressed as a set of raw base time bits;
capturing a raw base time value, denoted $t_r$, in response to an external event such as a trigger pulse;
calculating, when needed, local precise time, denoted $t_p$, based on the following relation:

$$t_p = A \cdot t_r + B,$$

where A and B are configurable parameter values, which control the speed and setting of the local precise time in relation to the raw base time,
wherein said step of continuously generating raw base time is based on successively incrementing a counter,
wherein said step of capturing a raw base time value includes the step of copying the contents of the counter into a counter register in response to the external event,
wherein said parameter values A and B are held in parameter registers,
wherein said counter register and said parameter registers are read to access the corresponding register values for calculating local precise time of the timer system,
wherein said continuously generated raw base time is maintained in said incrementing counter for a first portion of the set of raw base time bits of the raw base time in combination with a continuation of the raw base time for a remaining portion of the set of raw base time bits in a memory of an associated processor,
wherein said continuation of the raw base time in the processor memory is updated when the counter wraps around, and
wherein said register value of the counter register is read and delivered together with its continuation from the processor memory as a raw base time stamp for translation into local precise time.

15. The method of claim 14, wherein said method comprises the step of inhibiting an increment of the counter at predetermined intervals to increase the precision of the raw base time.

16. The method of claim 14, wherein said calculating step is performed by program code in a processor.

17. The method of claim 14, wherein a lowest level of programmed control, the level closest to the hardware and most time critical, is executed by dedicated microcode in a microcode-programmed processor.

18. A method for generating a precisely timed output signal, said method comprising the steps of:
continuously generating raw base time, the raw base time being expressed as a set of raw base time bits;
defining a precise time, denoted $t_p$, of a desired timing event for the output signal;
calculating a coincidence value as a corresponding raw base time value, denoted $t_r$, based on the following relation:

$$t_r = (t_p - B)/A,$$

where A and B are configurable parameter values, which control the speed and setting of the local precise time in relation to the raw base time; and
generating the timed output signal when a value of the continuously generated raw time base is equal to the calculated coincidence value,
wherein said step of continuously generating raw base time is based on successively incrementing a counter,
wherein said continuously generated raw base time is maintained in said incrementing counter for a first portion of the set of raw base time bits of the raw base time in combination with a continuation of the raw base time for a remaining portion of the set of raw base time bits in a memory of an associated processor,
wherein said continuation of the raw base time in the processor memory is regularly updated when the counter wraps around,
wherein a number of the bits of the coincidence value, corresponding in number and position to the first portion of the set of raw base time bits of the raw base time in the counter, are loaded into a coincidence register, and continually compared to the incrementing value of the counter,
wherein an output transition of the timed output signal is produced when both the value of the counter is equal to the value of the coincidence register and the continuation of the raw base time in the processor memory is equal to the continuation of the calculated coincidence value.

19. The method of claim 18, wherein said step of generating the timed output signal includes the step of generating a transition in the timed output signal in the cycle in which the value of the continuously generated raw time base is equal to the calculated coincidence value.

20. The method of claim 18, wherein said method comprises the step of inhibiting an increment of the counter at predetermined intervals to increase the precision of the raw base time.

21. The method of claim 18, wherein a lowest level of programmed control, the level closest to the hardware and most time critical, is executed by dedicated microcode in a microcode-programmed processor.

* * * * *